United States Patent [19]

Mourot et al.

[11] Patent Number: 5,606,580
[45] Date of Patent: Feb. 25, 1997

[54] METHOD OF ADJUSTING THE LENGTH OF A DATA BLOCK IN A TIME-DIVISION MULTIPLE ACCESS COMMUNICATION SYSTEM

[75] Inventors: Christophe Mourot, Asnieres; Vinod Kumar, Paris; Jean-Claude Dany; Armelle Wautier, both of Gif Sur Yvette, all of France

[73] Assignee: Alcatel N.V., Amsterdam, Netherlands

[21] Appl. No.: 275,732

[22] Filed: Jul. 19, 1994

[30] Foreign Application Priority Data

Jul. 20, 1993 [FR] France ................................ 93 08874

[51] Int. Cl.⁶ .............................. H03D 1/00; H03H 7/30
[52] U.S. Cl. ........................ 375/340; 375/231; 375/348; 370/465
[58] Field of Search .................... 375/340, 246, 375/253, 346, 348, 350, 231, 341, 343, 232, 233, 240, 266, 324; 370/95.3, 95.1; 455/296, 303, 307; 364/724.19, 724.2

[56] References Cited

U.S. PATENT DOCUMENTS

| 5,313,457 | 3/1995 | Hostetter ................................ 370/18 |
| 5,450,395 | 9/1995 | Hostetter et al. ...................... 370/18 |
| 5,519,727 | 3/1996 | Okanoue et al. ...................... 275/232 |
| 5,537,438 | 7/1996 | Mourot et al. ......................... 375/231 |

OTHER PUBLICATIONS

G. W. Davidson, "An Investigation of Block–Adaptive Decision Feedback Equalization for Frequency Selective Fading Channels", *Canadian Journal Of Electrical And Computer Engineering*, vol. 13, No. 3–4, 1988 pp. 106–111.
A. Miliewski, "Periodic Sequnces with Optimal Properties for Channel Estimation and Fast Start–Up Equalization", *IBM Journal Of Research And Development*, vol. 27, No. 5, Sep. 1993, pp. 426–431.

*Primary Examiner*—Wellington Chin
*Assistant Examiner*—William Luther
*Attorney, Agent, or Firm*—Sughrue, Mion, Zinn, Macpeak & Seas

[57] ABSTRACT

A method for adjusting the length of a data block in a time-division multiple access communication system includes estimating the impulse response of a communication channel from received symbols of a reference sequence, estimating a signal-to-noise ratio from the channel impulse response, and estimating a maximum Doppler shift. Using these estimations, upper and lower limit functions of a normalized estimated mean squared error are calculated, and the length of the data block is adjusted to an optimal length determined from the upper and lower limit functions.

7 Claims, 3 Drawing Sheets

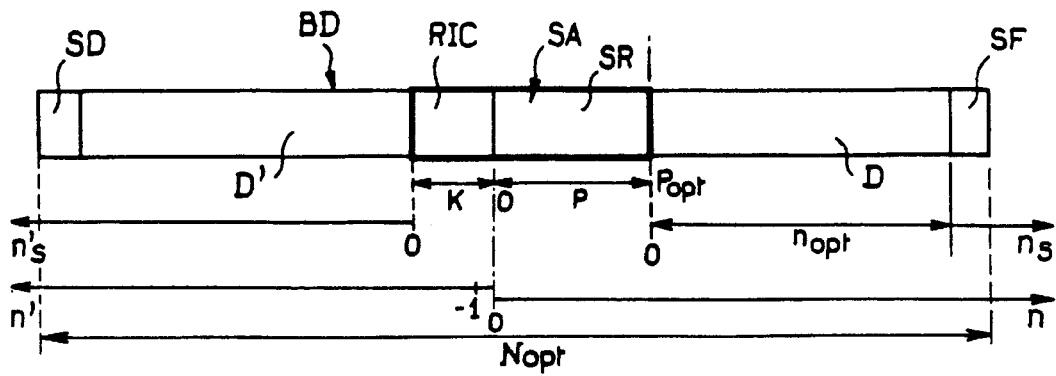
FIG_1
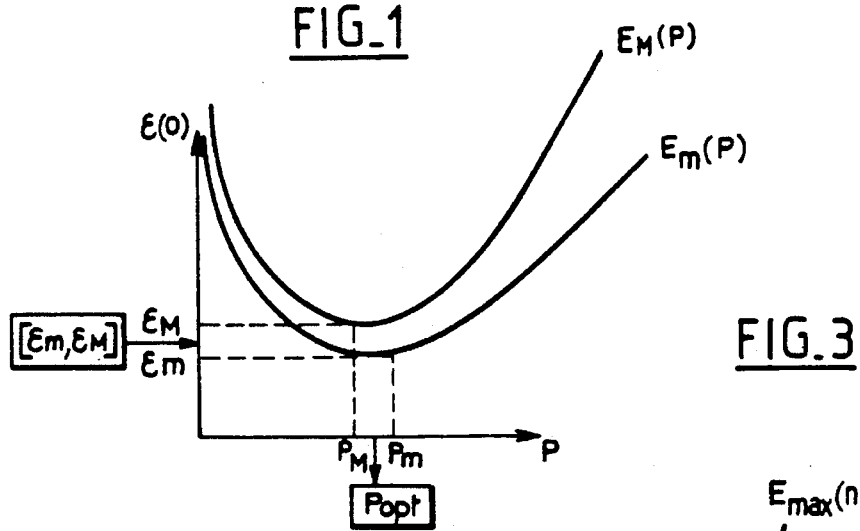
FIG_3
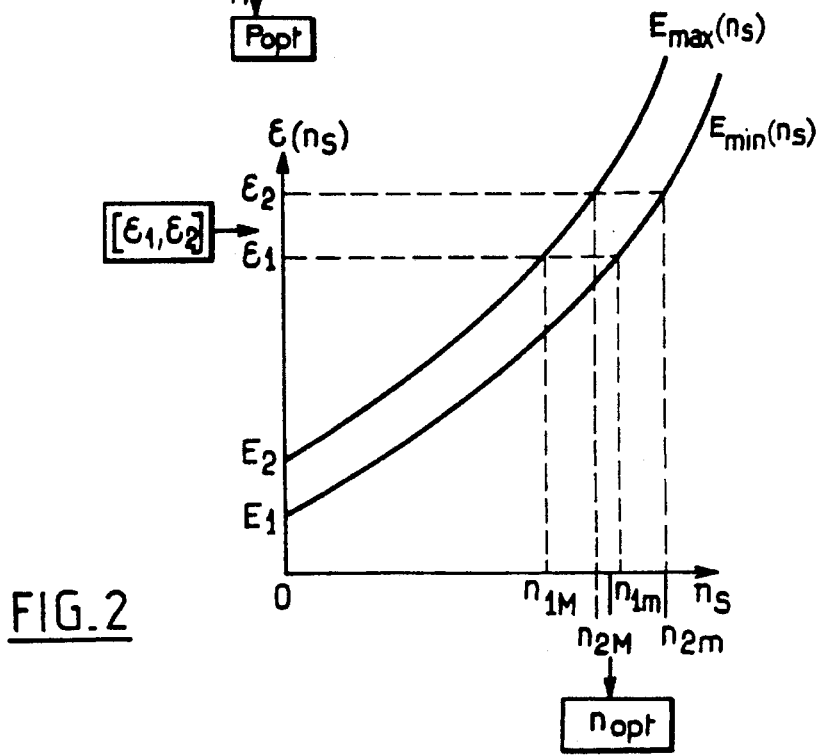
FIG_2

METHOD OF ADJUSTING THE LENGTH OF A DATA BLOCK IN A TIME-DIVISION MULTIPLE ACCESS COMMUNICATION SYSTEM

BACKGROUND OF THE INVENTION

The present invention concerns a method for determining the optimal length of a receive data block in a time-division multiple access (TDMA) communication system.

In a time-division multiple access (TDMA) communication system the structure of the signal is organized into time slots and the time spreads in multipath channels cause intersymbol interference if they exceed the symbol interval, in which case an equalizer must be used.

To each time slot there corresponds a data block comprising information data symbols and a training sequence known to the receiver. The training sequence is usually placed in the middle of the data block in order to minimize the effect of channel fluctuations that the receiver must allow for. A data block usually comprises start symbols, stop symbols, data symbols and a training sequence inserted in the middle of the data. The size of a data block is a compromise between:

the requirements of the service, namely the number of data symbols to be transmitted per block;

the rate of variation of the communication channel; and the efficiency required of the radio channel, which is defined by the maximal value of the ratio of the number of data items to the size of the block.

An equalizer is used to correct intersymbol interference in a receiver. To operate correctly it must know the impulse response of the transmission channel. To this end, special symbols known to the receiver are transmitted in the training sequence. It is assumed that the symbols of the data transmitted are not known to the receiver.

A training sequence is usually made up of K precursor symbols, P reference symbols and optionally K "postcursor" symbols, where K is the length of the transmission channel which is defined as the number of symbol intervals equivalent to the difference between the longest path and the shortest path of the channel, with $P \geq K+1$.

The training sequence is chosen to suit the transmission channel and in particular its length.

A channel estimator device is used in the receiver to establish the impulse response of the channel. It generates a replica of the training sequence and correlates it with the respective received symbol sequence. The result of this correlation is a set of coefficients $h_i$ with i varying from 0 through L where L is the channel length. This set of coefficients is then supplied to the equalizer. The most direct path on the channel is represented by ho, whereas the other coefficients represent longer paths which interfere with the first.

It is essential to size the data sequences of a block in such a way as to reconcile a sufficient or specified efficiency of the radio channel and a valid estimated impulse response of the channel for all data symbols including those at both ends of the block and therefore farthest away from the training sequence.

A first method of determining the length of a data block is to use simulation results, such as those described in the article "An investigation of block-adaptive decision feedback equalization for frequency selective fading channels" by G. W. DAVIDSON, D. D. FALCONER and A. U. H. SHEIK, Canadian J. Elect. & Comp. Eng, Vol.13 No.3-4, 1988, which discloses simulation results for a decision feedback equalizer emphasizing the influence of the training sequence length on receiver performance.

A second method of determining an optimal length is to base this determination on the results of measurements carried out in the field. This method has the major drawback of being costly and of being dependent on specific environment conditions.

SUMMARY OF THE INVENTION

An object of the present invention is to remedy these drawbacks by proposing a method of determining the optimal length of a data block which can guarantee transmission of information symbols with control of receiver estimation errors by adapting the length of a data block to the time-varying behavior of a channel.

These objectives are achieved with the method of determining the optimal length of a data block transmitted on a time-varying communication channel of a time-division multiple access (TDMA) communication system, said data block comprising a training sequence including a reference sequence preceded by precursor symbols and data symbols divided into a first data sequence and a second data sequence respectively transmitted before and after said training sequence, said communication channel having an impulse response of finite length.

In accordance with the invention, this method is characterized in that it comprises a stage of optimizing the length of a data sequence in which the impulse response of the communication channel is estimated from received symbols of the reference sequence, there is associated with each data sequence an estimate mean squared error for which a range is determined by lower and upper limit functions depending among other things on the length of said data sequence and the length of the reference sequence, and a range for the optimal length of said data sequence corresponding to a specified range of mean squared error is determined from said lower and upper limit functions.

The method of the invention thus provides a tool for determining the optimal length of the data sequences of a block which uses the estimation of the channel impulse response which is carried out anyway in the receiver for purposes of equalization. The method of the invention can therefore be implemented in the receiver without requiring data or parameters other than those already transmitted in the data block and the corresponding algorithm can be implemented in the processor provided for receive processing of the data blocks and in particular for equalizing the data.

In an advantageous embodiment of the method of the invention, the method further comprises a step of optimizing the length of the reference sequence in which there are deduced from upper and lower limit functions bracketing the estimate mean squared error specific upper and lower limit functions bracketing the estimate mean squared error corresponding to the reference sequence.

Optimizing the reference sequence yields a reasonable size for the training sequence, which helps to minimize the influence of channel variations during estimation and to optimize the efficiency of use of the radio channel.

Other features and advantages of the invention will emerge from the following description.

FIG. 1 shows the structure of a data block and the principal dimensional parameters used in the method of the invention;

FIG. 2 shows a graphical method of determining the optimal length of a data sequence using the method of the invention.

FIG. 3 shows a graphical method of determining the optimal length of the reference sequence.

DETAILED DESCRIPTION OF THE PREFERRED EMBODIMENTS

Figure 4:
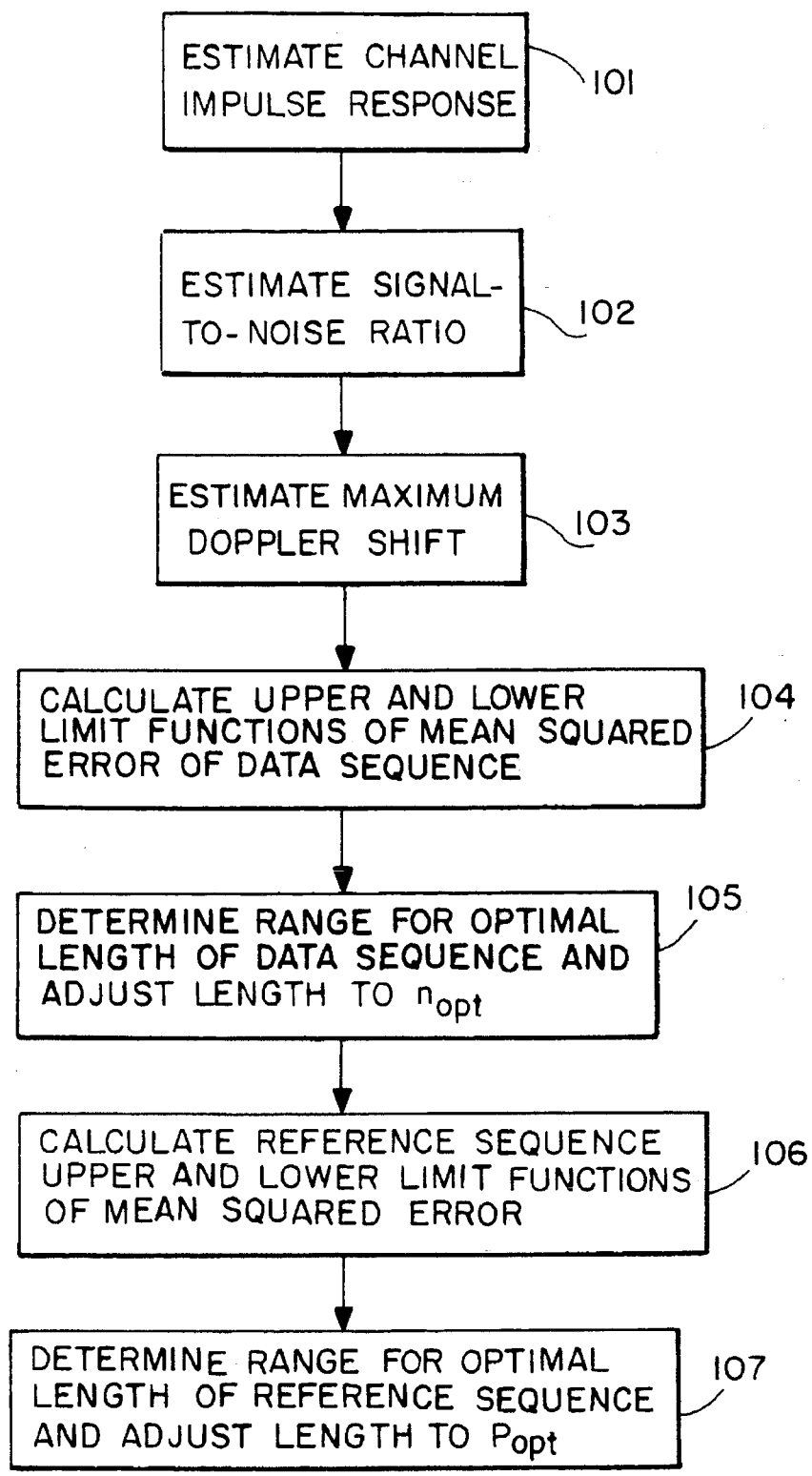
FIG. 4 is a flow chart illustrating the steps of the present invention.

There follows a theoretical discussion needed for understanding the method of the invention, given with reference to FIGS. 1 through 3.

Notation:

K: the length of the impulse response of the channel RIC,

P: the length of the reference sequence SR in the training sequence SA,

L: the length of the training sequence SA,

H: the vector of the coefficients of the real impulse response (this vector is not directly accessible in the receiver), $\hat{H}$: the vector of the coefficients of the estimated impulse response of the channel, R: the vector of the received symbols corresponding to the reference sequence SR in the training sequence SA, B: the vector of the noise samples affecting the communication channel, where $b_i$ represents Gaussian white noise with a null mean and a variance of $\sigma_n^2/2$, for example.

$$H: \begin{vmatrix} h_0 \\ h_1 \\ \cdot \\ \cdot \\ \cdot \\ h_K \end{vmatrix} \quad \hat{H}: \begin{vmatrix} \hat{h}_0 \\ \hat{h}_1 \\ \cdot \\ \cdot \\ \cdot \\ \hat{h}_K \end{vmatrix} \quad R: \begin{vmatrix} r_{K+1} \\ r_{K+2} \\ \cdot \\ \cdot \\ \cdot \\ r_L \end{vmatrix} \quad B: \begin{vmatrix} b_{K+1} \\ b_{K+2} \\ \cdot \\ \cdot \\ \cdot \\ b_L \end{vmatrix}$$

E: the vector of the coefficients of the estimate mean squared error, and

A: a matrix $(L-K) \times (K+1)$ completely defined by the training symbols transmitted $x_1, \ldots, x_L$.

A is given by $$A^H = \begin{bmatrix} x_{K+1}^* & \cdot & \cdot & x_L^* \\ x_K^* & \cdot & \cdot & \cdot \\ \cdot & \cdot & \cdot & \cdot \\ x_1^* & \cdot & \cdot & x_{L-K}^* \end{bmatrix}$$

where $.^H$ is the Hermitian operator and $.^*$ is the complex conjugate operator. Although the channel is theoretically of infinite length, an approximation is usually employed in the form of a linear transversal filter of finite length K+1, as disclosed for example in "Digital communications" by J. G. PROAKIS, 2nd edition, McGRAW HILL 1989.

The vector of the received reference symbols R and $x_1, \ldots, x_L$ are related by the following equation:

$$r_i = \sum_{k=0}^{K} h_k x_{i-k} + b_i \quad i = K+1, \ldots, L \quad (1)$$

This equation can also be written in the following form:

$$R = AH + B \quad (2)$$

Also:

$$E = R - A\hat{H} \quad (3)$$

Let:

$$J = E^H E \quad (4)$$

H is chosen by an estimation in the least squares sense. H minimizes J and therefore satisfies:

$$\frac{\partial J}{\partial H} = -2A^H R + 2A^H AH = 0 \quad (5)$$

This equation has a single solution if and only if $L \geq 2K+1$, i.e. if and only if the number of columns in $A^H$ is greater than or equal to the number of rows.

Thus, if the matrix $A^H A$ can be inverted, the following expression is obtained:

$$\hat{H} = (A^H A)^{-1} A^H R \quad (6)$$

Constant amplitude zero autocorrelation (CAZAC) and pseudo-CAZAC sequences satisfy this condition.

In the case of a time-varying channel, normalized correlation functions $R_i(\Delta_t)$ are defined for the various paths of the channel. In addition to the correlation properties of the training sequence, the exact values of the symbols which constitute it influence the accuracy with which the impulse response of the channel is estimated. For a CAZAC sequence, however, assuming that the various paths of the channel and the noise samples are statistically independent, a time-varying channel can be modelled by a digital transversal filter.

The coefficients of the impulse response satisfy the equations:

$$E[h_j(k)h_i^*(1)] = 0 \text{ for } i \neq j \; \forall k, 1 \quad (7)$$

$$E[h_j(k)h_j^*(1)] = \sigma_j^2 R_j((k-1)T_s) \; \forall k, 1 \quad (8)$$

where:

Ts is a symbol transmission period, $\sigma_j^2$ is the mean power of the jth path In the remainder of the description and to make the latter easier to read, R(k) is substituted for $R(kT_s)$.

The remainder of the description assumes that the training sequence is of the CAZAC type and is periodic with period P. Consider the symbols $u_0, \ldots, u_{p-1}$ of the reference sequence transmitted on the communication channel. To simplify the notation, hereinafter:

$$u_{-i} = u_{p-i} \; i \in [1, P-L], u_{i+p} = u_i \; i \in [0, P-1] \quad (9)$$

It is further assumed that $|u_j| = 1$. The sample received without noise can be expressed as follows:

$$y(n) = \sum_{k=0}^{K} u_{n-k} h_k(n) \text{ for } n \in [0, P-1] \quad (10)$$

In the absence of noise, and from equation (6), an estimate of the channel coefficients is expressed as follows (step 101 in FIG. 4):

$$\hat{h}_i = \frac{1}{P} \sum_{\lambda=1}^{P} \sum_{k=0}^{K} u_{\lambda-i-1}^* u_{\lambda-k-1} h_k(\lambda-1) \text{ for } i \in [0,K] \quad (11)$$

The coefficient estimate mean squared error is given by:

$$E[(\hat{h}_i - h_i(n))(\hat{h}_i - h_i(n))^*] = E[\hat{h}_i \hat{h}_i^*] - E[\hat{h}_i h_{ii}^*(n)] - E[\hat{h}_i^* h_i(n)] + \sigma_i^2 \quad (12)$$

$E[\hat{h}_i h_i^*(n)]$ can be expressed as follows:

$$E[\hat{h}_i h_i^*(n)] = \frac{1}{P} \sum_{\lambda=1}^{P} \sum_{k=0}^{K} u_{\lambda-i-1}^* u_{\lambda-k-1} h_k(\lambda-1) h_i^*(n) \quad (13)$$

From equation (7), it is possible to deduce that:

$$E[\hat{h}_i h_i^*(n)] = \frac{1}{P} \sum_{\lambda=1}^{P} |u_{\lambda-i-1}|^2 h_i(\lambda-1) h_i^*(n) \quad (14)$$

and consequently that:

$$E[\hat{h}_i h_i^*(n)] = E[\hat{h}_i^* h_i(n)] = \frac{1}{P} \sigma_i^2 \sum_{\lambda=1}^{P} R_i(\lambda - n - 1) \quad (15)$$

$E[\hat{h}_i \hat{h}_i^*]$ is defined by:

$$E[\hat{h}_i \hat{h}_i^*] = \frac{1}{P^2} E\left( \sum_{\lambda=1}^{P} \sum_{\gamma=1}^{P} \sum_{k=0}^{K} \sum_{l=0}^{K} u_{\lambda-k-1} u_{\lambda-i-1}^* u_{\gamma-l-1}^* u_{\gamma-i-1} h_k(\lambda-1) h_l^*(\gamma-1) \right) \quad (16)$$

From equations 7) and (8) it follows that:

$$E[\hat{h}_i \hat{h}_i^*] = \quad (17)$$

$$\frac{1}{P^2} \sum_{\lambda=1}^{P} \sum_{\gamma=1}^{P} \sum_{k=0}^{K} u_{\lambda-k-1} u_{\lambda-i-1}^* u_{\gamma-k-1}^* u_{\gamma-i-1} \sigma_k^2 R_k(\lambda - \gamma)$$

To obtain an upper limit of $$\sum_{i=0}^{K} E[\hat{h}_i h_i^*],$$

it is possible to use an equality relating the length P of the reference sequence and the length K of the impulse response of the channel, imposed to satisfy the condition for a single estimate vector H:

$$P \geq K+1 \quad (18)$$

From this inequality it is possible to deduce that:

$$\sum_{i=0}^{K} E[\hat{h}_i \hat{h}_i^*] \leq \sum_{i=0}^{P-1} E[\hat{h}_i \hat{h}_i^*] \quad (19)$$

Therefore:

$$\sum_{i=0}^{K} E[\hat{h}_i \hat{h}_i^*] \leq \frac{1}{P^2} \left( \sum_{i=0}^{P-1} \sum_{\lambda=1}^{P} \sum_{\gamma=1}^{P} \sum_{k=0}^{K} u_{\lambda-k-1} u_{\lambda-i-1}^* u_{\gamma-k-1}^* u_{\gamma-i-1} \sigma_k^2 R_k(\lambda-\gamma) \right) \quad (20)$$

$$\leq \frac{1}{P^2} \left( \sum_{\lambda=1}^{P} \sum_{\gamma=1}^{P} \sum_{k=0}^{K} u_{\lambda-k-1} u_{\gamma-k-1}^* \sigma_k^2 R_k(\lambda-\gamma) \sum_{i=0}^{P-1} u_{\lambda-i-1}^* u_{\gamma-i-1} \right) \quad (21)$$

As the reference sequence is assumed to be of the CAZAC type, it follows that:

$$\sum_{i=0}^{P-1} u_{\lambda-i-1}^* u_{\gamma-i-1} = \quad 0 \text{ for } \lambda \neq \gamma \quad (22)$$
$$P \text{ for } \lambda = \gamma$$

Consequently:

$$\sum_{i=0}^{K} E(\hat{h}_i \hat{h}_i^*) \leq \frac{1}{P} \sum_{\lambda=1}^{P} \sum_{k=0}^{K} u_{\lambda-k-1} u_{\lambda-k-1}^* \sigma_k^2 R_k(0) \quad (23)$$

$$\leq \frac{1}{P} \sum_{k=0}^{K} \sigma_k^2 R_k(0) \sum_{\lambda=1}^{P} |u_{\lambda-k-1}|^2 \quad (23.1)$$

$$\leq \frac{1}{P} \sum_{k=0}^{K} \sigma_k^2 R_k(0) P \quad (23.2)$$

$$\leq \sum_{k=0}^{K} \sigma_k^2 \quad (23.3)$$

$$\sum_{i=0}^{K} E(\hat{h}_i \hat{h}_i^*) \leq \sigma^2 \quad (24)$$

where $$\sigma^2 = \sum_{k=0}^{K} \sigma_k^2 \quad (25)$$

$\sigma^2$ represents the mean power of the channel.

The next step is to determine a lower limit for $$\sum_{i=0}^{K} E(\hat{h}_i \hat{h}_i^*).$$

To this end there is introduced a mean estimate $\tilde{h}_i$ of the channel coefficient estimates with cyclic offset of the same training sequence:

$$\tilde{h}_i = \frac{1}{P^2} \sum_{n=0}^{P-1} \sum_{\lambda=1}^{P} \sum_{k=0}^{K} u_{\lambda-k-1+n} u_{\lambda-i-1+n}^* h_k(\lambda-1) \quad (26)$$

$$= \frac{1}{P} \sum_{\lambda=1}^{P} h_i(\lambda-1) \quad (26.1)$$

It is then possible to deduce an upper limit from the following inequality:

$$E[(\hat{h}_i - \tilde{h}_i)(\hat{h}_i^* - \tilde{h}_i^*)] = E[\hat{h}_i \hat{h}_i^*] - E[\hat{h}_i \tilde{h}_i^*] - E[\hat{h}_i^* \tilde{h}_i] - E[\tilde{h}_i \tilde{h}_i^*] \geq 0 \quad (27)$$

Thus:

$$E[\hat{h}_i \tilde{h}_i^*] = E[\hat{h}_i^* \tilde{h}_i] = \frac{1}{P^2} \sum_{\lambda=1}^{P} \sum_{\gamma=1}^{P} \sigma_i^2 R_i(\lambda-\gamma) \quad (28)$$

$$E[\tilde{h}_i \tilde{h}_i^*] = \frac{1}{P^2} \sum_{\lambda=1}^{P} \sum_{\gamma=1}^{P} \sigma_i^2 R_i(\lambda-\gamma) \quad (29)$$

Substituting equations (28) and (29) in equation (27):

$$E[\hat{h}_i \hat{h}_i^*] \geq \frac{1}{P^2} \sum_{\lambda=1}^{P} \sum_{\gamma=1}^{P} \sigma_i^2 R_i(\lambda-\gamma) \quad (30)$$

Finally:

$$\sum_{i=0}^{K} E[(\hat{h}_i - h_i(n))(\hat{h}_i - h_i(n))^*] \leq \sum_{i=0}^{K} 2\sigma_i^2 \left( 1 - \frac{1}{P} \sum_{\lambda=1}^{P} R_i(\lambda - n - 1) \right) \quad (31)$$

$$\sum_{i=0}^{K} E[(\hat{h}_i - h_i(n))(\hat{h}_i - h_i(n))^*] \geq \quad (32) \Downarrow$$

-continued $$\sum_{i=0}^{K} \sigma_i^2 \left( 1 - \frac{2}{P} \sum_{\lambda=1}^{P} R_i(\lambda - n - 1) + \frac{1}{P^2} \sum_{\lambda=1}^{P} \sum_{\gamma=1}^{P} R_i(\lambda - \gamma) \right)$$

It is then beneficial to effect the following change of variable (see FIG. 2):

$$n_s = n - P \quad (33)$$

$$\sum_{\lambda=1}^{P} R_i(\lambda - n - 1) = \sum_{\mu=1}^{P} R_i(-\mu - P - n) = \sum_{\mu=1}^{P} R_i(\mu + n_s) \quad (34)$$

For the part preceding the training sequence, if a new variable $n' = -n - 1$ is introduced, and referring to FIG. 2:

$$n'_s = n' + K \quad (35)$$

$$\sum_{\lambda=1}^{P} R_i(\lambda - n - 1) = \sum_{\lambda=1}^{P} R_i(\lambda + n') = \sum_{\lambda=1}^{P} R_i(\lambda + n_s + K) \quad (36)$$

Next the upper and lower limits of the estimation error are determined as a function of the new variable $n_s$.

$$\sum_{i=0}^{K} E|\hat{h}_i - h_i(n_s)|^2 \leq \frac{(K+1)\sigma_n^2}{P} + \quad (37)$$

$$\sum_{i=0}^{K} 2\sigma_i^2 \left[ 1 - \frac{1}{P} \sum_{\lambda=1}^{P} R_i(\lambda + n_s) \right]$$

$$\sum_{i=0}^{K} E|\hat{h}_i - h_i(n_s)|^2 \geq \frac{(K+1)\sigma_n^2}{P} + \quad (38)$$

$$\sum_{i=0}^{K} \sigma_i^2 \left[ 1 - \frac{2}{P} \sum_{\lambda=1}^{P} R_i(\lambda + n_s) + \frac{1}{P^2} \sum_{\lambda=1}^{P} \sum_{\gamma=1}^{P} R_i(\lambda - \gamma) \right]$$

where $\sigma_i^2$ is the mean power of the ith path and $n_s$ corresponds to the first symbol after the training sequence in the block.

For the data sequence D preceding the training sequence, the inequalities (37) and (38) become:

$$\sum_{i=0}^{K} E|\hat{h}_i - h_i(n'_s)|^2 \leq \frac{(K+1)\sigma_n^2}{P} + \quad (37')$$

$$\sum_{i=0}^{K} 2\sigma_i^2 \left[ 1 - \frac{1}{P} \sum_{\lambda=1}^{P} R_i(\lambda + n'_s + K) \right]$$

$$\sum_{i=0}^{K} E|\hat{h}_i - h_i(n'_s)|^2 \geq \frac{(K+1)\sigma_n^2}{P} + \quad (38')$$

$$\sum_{i=0}^{K} \sigma_i^2 \left[ 1 - \frac{2}{P} \sum_{\lambda=1}^{P} R_i(\lambda + n'_s + K) + \frac{1}{P^2} \sum_{\lambda=1}^{P} \sum_{\gamma=1}^{P} R_i(\lambda - \gamma) \right]$$

Assume now that the receiver moves at constant speed and that the multiple paths due to a large number of reflections have a uniform distribution of angles of incidence. The normalized correlation functions $R_i (\Delta_t)$ are then assumed equal to $R (\Delta_t)$ which is the Fourrier transform of the conventional Doppler spectrum and is given by:

$$R(\Delta_t) = J_o(2\pi f_d \Delta_t) \quad (39)$$

where $J_o$ is the first order Bessel function and $f_d$ is the maximal Doppler shift given by:

$$f_d = \frac{f_0 v}{c} \quad (40)$$

where $f_0$ is the carrier frequency, v is the speed of the mobile and c is the speed of light (step 103 in FIG. 4).

This corresponds to the worst case scenario for a time-varying mobile channel. If $2\pi f_d T_s n_s$ is small compared to 1, the following approximation applies:

$$R(n_s T_s) \approx 1 - (\pi f_d T_s)^2 n_s^2 \quad (41)$$

If $\epsilon(n_s)$ is the normalized estimate error at the symbol position $n_s$, defined by:

$$\epsilon(n_s) = \frac{1}{\sigma^2} \sum_{i=0}^{K} E|\hat{h}_i - h_i(n_s)|^2 \quad (42)$$

where $\sigma^2$ is the mean power of the channel, given by:

$$\sigma^2 = \sum_{i=0}^{K} \sigma_i^2 \quad (43)$$

The remainder of the description concerns QPSK modulation. The ratio $$\frac{|s|^2 \sigma^2}{\sigma_n^2}$$

can be replaced by the signal/noise ratio $$\frac{2E_b}{N_0}$$

where $E_b$ denotes the energy transmitted per bit and $$\frac{N_0}{2}$$

denotes the bilateral density of Gaussian additive white noise (step 102 in FIG. 4). In the present case there are two bits per symbol, but more generally, in the case of phase-shift keying with M states (MPSK), there are $\log_2 M$ bits per symbol.

It is then possible to define upper and lower limit functions for the optimal length of the data sequence (step 104 in FIG. 4).

$$\epsilon(n_s) \leq \frac{K+1}{P} \cdot \frac{N_0}{2E_b} + \quad (44)$$

$$2(\pi f_d T_s)^2 \left( \frac{(P+1)(2P+1)}{6} + (P+1)n_s + n_s^2 \right) = E_{max}(n_s)$$

$$\epsilon(n_s) \geq \frac{K+1}{P} \cdot \frac{N_0}{2E_b} + \quad (45)$$

$$2(\pi f_d T_s)^2 \left( \frac{(P+1)^2}{4} + (P+1)n_s + n_s^2 \right) = E_{min}(n_s)$$

For the data sequence D' preceding the training sequence the following limit functions are obtained in the same manner:

$$\epsilon(n'_s) \leq \frac{K+1}{P} \cdot \frac{N_0}{2E_b} + \quad (44')$$

$$2(\pi f_d T_s)^2 \left( \frac{(P+1)(2P+1)}{6} + (P+1)(n'_s + K) + (n'_s + K)^2 \right) = E_{max}(n'_s)$$

$$\epsilon(n'_s) \geq \frac{K+1}{P} \cdot \frac{N_0}{2E_b} + \quad (45')$$

$$2(\pi f_d T_s)^2 \left( \frac{(P+1)^2}{4} + (P+1)(n'_s + K) + (n'_s + K)^2 \right) = E_{min}(n'_s)$$

The optimal length $n_{opt}$ of a block, which must be chosen so that the corresponding estimate mean squared error is in a predetermined range, thus depends on the following parameters:

the length K of the channel, the length P of the reference sequence, the signal/noise ratio $E_b/2N_0$, the maximal Doppler shift $f_d$, and the symbol interval $T_s$, which is the reciprocal of the symbol rate.

The aforementioned two limit functions can be represented graphically as two parabolas P1, P2 which intersect the abscissa axis at E1 and E2 (see FIG. 2):

$$E = \frac{K+1}{P} \cdot \frac{N_0}{2E_b} + 2(\pi f_d T_s)^2 \frac{(P+1)^2}{4} \quad (46)$$

$$E = \frac{K+1}{P} \cdot \frac{N_0}{2E_b} + 2(\pi f_d T_s)^2 \frac{(P+1)(2P+1)}{6} \quad (47)$$

Only positive values of $n_s$ are considered, because $n_s$ represents a length and is therefore always positive or zero.

The optimal length $n_{opt}$ can therefore be determined graphically, see FIG. 2: a range $[\epsilon_1, \epsilon_2]$ is specified for $\epsilon(n_s)$. This error range is applied to the lower and upper limit functions to deduce therefrom two ranges $[n_{1M}, n_{1m}]$ and $[n_{2M}, n_{2m}]$ respectively corresponding to the lower limit $\epsilon_1$ and the upper limit $\epsilon_2$. The intersection of these two ranges provides a resultant range in which an optimal length $n_{opt}$ for the data sequence can be chosen (step 105 in FIG. 4).

A similar procedure can be used to determine a range for the optimal length $n'_{opt}$ of the data sequence D' preceding the training sequence.

There follows an explanation of a method of determining the optimal length of the reference sequence from the expressions for $E_{min}$ and $E_{max}$ just established (step 106 in FIG. 4). It is sufficient to take $n_s$ equal to zero in these expressions, as this corresponds to the end of the reference sequence. The following inequalities are then obtained for the estimate mean squared error corresponding to the symbol of the reference sequence at $n_s=0$.

This defines two new functions $E_m(P)$, $E_M(P)$ respectively corresponding to the lower and upper limits of the estimate mean squared error for the reference sequence, as a function of the length of the latter:

$$E_m(P) = \frac{K+1}{P} \cdot \frac{N_0}{2E_b} + 2(\pi f_d T_s)^2 \frac{(P+1)^2}{4} \quad (48.1)$$

$$E_M(P) = \frac{K+1}{P} \cdot \frac{N_0}{2E_b} + 2(\pi f_d T_s)^2 \frac{(P+1)(2P+1)}{6} \quad (48.2)$$

$$E_m(P) \leq \epsilon(0) \leq E_M(P) \quad (48.3)$$

The training sequence must be sufficiently long for estimating the channel ($P \geq K+1$) but also sufficiently short to minimize the influence of channel variations during estimation. A sequence which is too long degrades the performance of the receiver. The lower and upper limits of the mean squared error are functions $E_m(P)$, $E_M(P)$ of the length P of the reference sequence. Minimizing the upper limit $E_M(P)$ of the mean squared error $\epsilon$ is achieved for a length $P_M$ given by the equation:

$$P_M = \sqrt[3]{\frac{3}{4}} \sqrt[3]{\frac{(k+1)}{(\pi f_d T_s)^2} \frac{N_0}{2E_b}} \quad (49)$$

The lower limit $E_m(P)$ is minimized for a length $P_m$ given by the equation:

$$P_m = \sqrt[3]{\frac{(k+1)}{(\pi f_d T_s)^2} \frac{N_0}{2E_b}} \quad (50)$$

The optimal length $P_{opt}$ of the reference sequence must thus be chosen in the range $[P_M, P_m]$ which corresponds to a range $[e_m, e_M]$ of estimate minimum mean squared error (step 107 in FIG. 4).

With the method of the invention the length of the data sequences and the reference sequence can be chosen to hold the estimate mean squared error below a predetermined error threshold or within a predetermined range.

Figure 5:
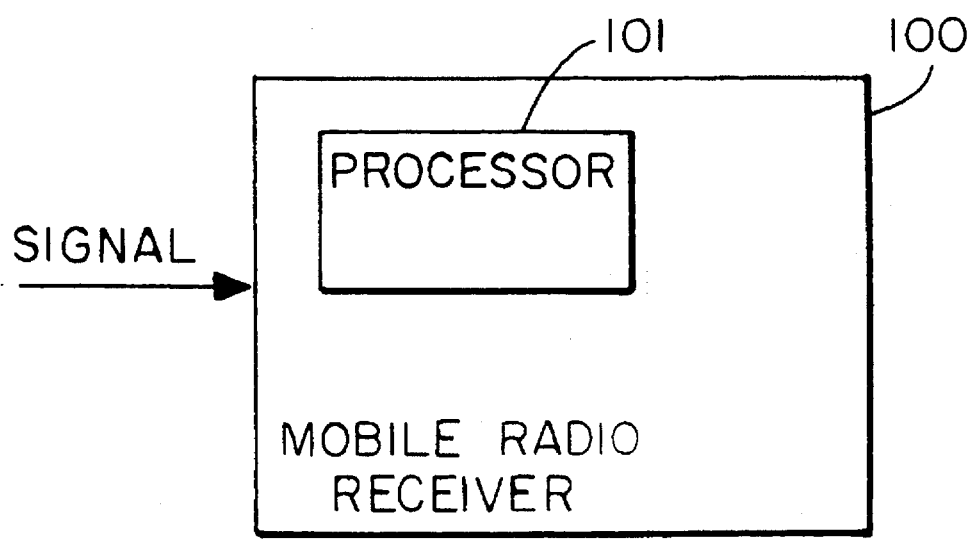

The method of the invention can be implemented as an algorithm implemented in a processor 101 installed in a mobile radio receiver 100 and whose functions include estimation and equalization, for example (see FIG. 5). It can equally be implemented in the form of truth tables supplying optimal length indications prestored in memory as a function of input parameters supplied by an estimator, for example.

Of course, the invention is not limited to the examples that have just been described and numerous modifications can be made to those examples without departing from the scope of the invention.

What is claimed is:

1. A method of adjusting the length of a data block (BD) in accordance with time-varying behavior of a communication channel, the data block being transmitted as a signal on the time-varying communication channel of a time-division multiple access (TDMA) communication system, the signal being received at a receiver, said data block (BD) comprising: a training sequence (SA) including a reference sequence (SR) of length P; and a data sequence (D) of length $n_s$ containing data symbols having a symbol interval ($T_s$), said communication channel having an impulse response of finite length K, the method comprising the steps of:

estimating the impulse response of the communication channel from received symbols of the reference sequence (SR);

estimating a signal-to-noise ratio from the channel impulse response;

estimating a maximum doppler shift of the signal at the receiver;

calculating, from the signal-to-noise ratio, the doppler shift, the length K of the impulse response, the length P of the reference sequence (SR) and the symbol interval ($T_s$), lower and upper limit functions of normalized estimate mean squared error ($E_{min}(n_s)$, $E_{max}(n_s)$) as a function of the length $n_s$ of the data sequence (D);

determining a range for an optimal length of the data sequence (D) from the upper and lower limit functions and from a predetermined range of mean squared error which is acceptable in the communication system; and adjusting the length $n_s$ of the data sequence (D) to a length $n_{opt}$ which lies within said range for an optimal length of the data sequence.

2. The method according to claim 1, further comprising the steps of:

calculating, from the lower and upper limit functions, reference sequence lower and upper limit functions ($E_m(P)$, $E_M(P)$) bracketing a normalized estimate mean squared error corresponding to the reference sequence; and determining a range for an optimal length of the reference sequence (SR) from said reference sequence lower and upper limit functions ($E_m(P)$, $E_M(P)$); and adjusting the length P of the reference sequence (SR) to a length $P_{opt}$ which lies within said range for an optimal length of the reference sequence (SR).

3. Method according to claim 2, the normalized estimate mean squared error is limited by lower and upper limit functions ($E_m(P)$, $E_M(P)$) as follows:

$$E_m(P) = \frac{K+1}{P} \cdot \frac{N_0}{2E_b} + 2(\pi f_d T_s)^2 \frac{(P+1)^2}{4}$$

$$E_M(P) = \frac{K+1}{P} \cdot \frac{N_0}{2E_b} + 2(\pi f_d T_s)^2 \frac{(P+1)(2P+1)}{6}$$

where:

K is the length of the channel,

P is the length of the reference sequence (SR), $T_s$ is the symbol interval,

No/2 is a bilateral density of Gaussian additive white noise, $E_b$ is the energy transmitted per bit, $f_d$ is the maximal Doppler shift.

4. Method according to claim 3, wherein the optimal length of the reference sequence is bracketed by lower and upper limits ($P_M$, $P_m$) as follows:

$$P_M = \sqrt[3]{\frac{3}{4}} \sqrt[3]{\frac{(k+1)}{(\pi f_d T_s)^2} \frac{N_0}{2E_b}}$$

$$P_m = \sqrt[3]{\frac{(k+1)N_0}{(\pi f_d T_s)^2 \, 2E_b}}$$

where:

K is the length of the channel, $T_s$ is the symbol interval,

No/2 is a bilateral density of Gaussian additive white noise, $E_b$ is the energy transmitted per bit, $f_d$ is the maximal Doppler shift.

5. The method according to claim 1, wherein: the data block comprises constant amplitude zero autocorrelation (CAZAC) or pseudo-CAZAC type sequences; noise affecting the communication channel is approximated by the Gaussian additive white noise; the data sequence (D) is transmitted after the reference sequence (SR); the lower and upper limit functions ($E_{min}(n_s)$, $E_{max}(n_s)$) are calculated as follows:

$$E_{min}(n_s) = \frac{K+1}{P} \cdot \frac{N_0}{2E_b} + 2(\pi f_d T_s)^2 \left( \frac{(P+1)^2}{4} + (P+1)n_s + n_s^2 \right)$$

$$E_{max}(n_s) = \frac{K+1}{P} \cdot \frac{N_0}{2E_b} + 2(\pi f_d T_s)^2 \left( \frac{(P+1)(2P+1)}{6} + (P+1)n_s + n_s^2 \right)$$

where $n_s$ is the length of the data sequence,

K is the length of the channel,

P is the length of the reference sequence (SR), $T_s$ is the symbol interval,

No/2 is a bilateral density of Gaussian additive white noise, $E_b$ is the energy transmitted per bit, $f_d$ is the maximal Doppler shift; and the range for the optimal length ($n_{opt}$) is determined by applying the range of predetermined mean squared error to the lower and upper limit functions ($E_{min}(n_s)$, $E_{max}(n_s)$).

6. Method according to claim 1 wherein: the data block comprises constant amplitude zero autocorrelation (CAZAC) and pseudo-CAZAC type sequences; noise affecting the communication channel is approximated by Gaussian additive white noise; the data sequence (D) is transmitted before the reference sequence (SR); the lower and upper limit functions ($E_{min}(n_s)$, $E_{max}(n_s)$) are calculated as follows:

$$E_{min}(n_s) = \frac{K+1}{P} \cdot$$

$$\frac{N_0}{2E_b} + 2(\pi f_d T_s) \frac{(P+1)^2}{4} + (P+1)(n_s+K) + (n_s+K)^2)$$

$$E_{max}(n_s) = \frac{(K+1)}{P} \cdot$$

$$\frac{N_0}{2E_b} + 2(\pi f_d T_s)^2 \left( \frac{(P+1)(2P+1)}{6} + (P+1)(n_s+K) + (n_s+K)^2 \right)$$

where $n_s$ is the length of the data sequence,

K is the length of the channel,

P is the length of the reference sequence (SR), $T_s$ is the symbol interval,

No/2 is a bilateral density of Gaussian additive white noise, $E_b$ is the energy transmitted per bit, $f_d$ is the maximal Doppler shift; and the range for the optimal length is determined by applying the range of predetermined mean squared error to the lower and upper limit functions ($E_{min}(n_s)$, $E_{max}(n_s)$).

7. The method according to claim 1, wherein the data sequence comprises a preceding data sequence which is transmitted before the reference sequence, and a following data sequence which is transmitted after the reference sequence.

* * * * *